Jan. 4, 1949.   H. E. KORUM   2,458,389
CENTRIFUGALLY CONTROLLED PLANETARY GEARING
Filed Sept. 9, 1944   2 Sheets-Sheet 1

WITNESS
E. B. Bjurstrom

INVENTOR.
HENRY E. KORUM

ATTORNEYS

Jan. 4, 1949.   H. E. KORUM   2,458,389
CENTRIFUGALLY CONTROLLED PLANETARY GEARING
Filed Sept. 9, 1944   2 Sheets-Sheet 2

INVENTOR.
HENRY E. KORUM
ATTORNEYS

WITNESS

Patented Jan. 4, 1949

2,458,389

UNITED STATES PATENT OFFICE 2,458,389

CENTRIFUGALLY CONTROLLED PLANETARY GEARING

Henry E. Korum, East Moline, Ill., assignor to Deere & Company, Moline, Ill., a corporation of Illinois Application September 9, 1944, Serial No. 553,434

7 Claims. (Cl. 74—260)

The present invention relates generally to centrifugal clutch mechanisms of the type employed for connecting a driven member to a driving member after the latter has attained its normal operating speed, and also for disconnecting the driven member in case the speed of the driving member decreases below a predetermined amount. The type of mechanism is particularly useful for transmitting power to feeding mechanisms in crop treating machines such as, for example, hammer mills, corn shellers, or threshers, in which it is advantageous to bring the crop disintegrating rotor up to substantially full speed before any crop is fed into it, and also to interrupt the operation of the feeding mechanism after the machine has been disconnected from its source of power but before the cylinder or rotor comes to rest. This allows the rotor to clear itself and thus facilitates the succeeding starting operation by preventing the feeder from clogging the cylinder with material after the speed of the latter has decreased until it is insufficient to disintegrate the material. Other applications of a device of this kind are, of course, well known to those skilled in the art. The principal object of the present invention relates to the provision of a novel and improved centrifugal clutch mechanism which is more accurate and more sensitive and therefore operates to engage and disengage more consistently at the values predetermined by the adjustments, than do centrifugal clutches heretofore known to those skilled in the art.

A further object of my invention relates to the provision of a control mechanism of the class described, having quick make and quick break characteristics which act positively and provide a reasonable spread in speed between the engagement and disengagement of the power transmitting elements.

These and other objects and advantages of my invention will be apparent to those skilled in the art after a consideration of the following description in which reference is had to the drawings appended hereto, in which Figure 1 is an elevational view of a control mechanism embodying the principles of the present invention and taken in section along a line 1—1 in Figure 2.

Figure 1:
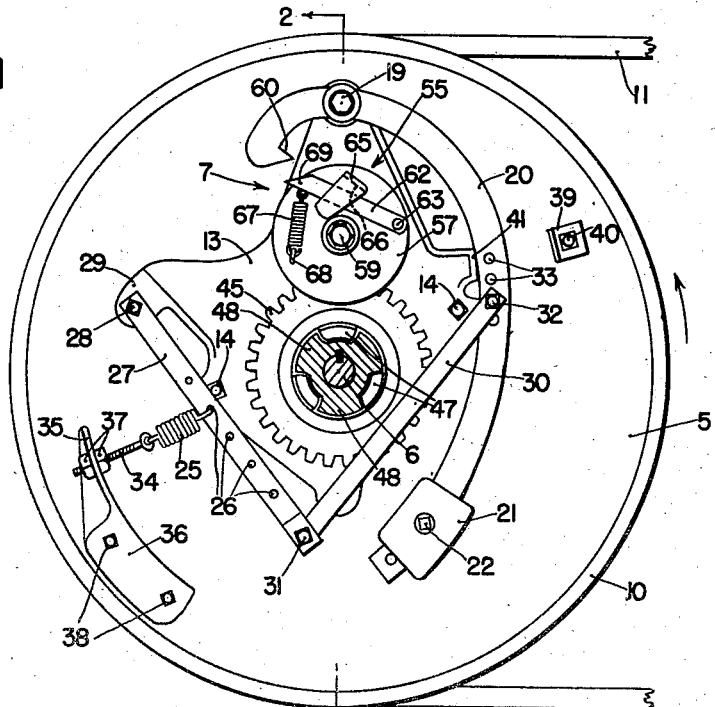

Referring now to the drawings, the power transmitting mechanism includes a driving member in the form of a V-belt pulley 5, a driven member in the form of a shaft 6, and a clutch mechanism connecting the driving and driven members, indicated in its entirety by reference numeral 7. The driven shaft 6 is journaled in a bearing 8, which is supported on a side wall 9 of the body of the machine and extends through the wall 9 to drive the feeder or other mechanism (not shown), the speed of which is to be controlled. The driving pulley 5 comprises a circular disk on which is mounted a peripherally extending sheave portion 10 adapted to receive a V-belt 11. The disk of the pulley is fixedly supported on a hub 12 which is journaled at the end of the shaft 6 and has a radially extending flange portion 13, to which the web or disk of the pulley 5 is connected by means of bolts 14. The pulley hub 12 is lubricated through a lubricating fitting 15 providing for free rotation on the shaft 6 and is held on the latter by a collar 16 which is fixed to the shaft 6 by means of a set screw 17.

The pulley 5 drives the shaft 6 through a flyball governor arm 20, which is pivotally connected to the flange 13 by means of a suitable bolt 19, and has a curved extension carrying a flyball or weight 21, the latter being adjustable along the curved portion of the arm 20 and can be fixed in adjusted position by means of a set screw 22. During rotation of the pulley 5 the flyball 21 tends to be forced outwardly away from the center of rotation by the action of centrifugal force, the centrifugal action of the arm being opposed by means of a tension spring 25. The spring 25 is hooked into one of a number of spaced holes 26 in a lever arm 27 which is pivotally connected by a bolt 28 to an ear 29 formed integrally with the pulley hub flange 13. A link 30 is pivoted by means of a bolt 31 to the end of the arm 27 and is connected at its opposite end to the flyball arm 20 by means of a bolt 32 which can be adjustably inserted into any of a number of spaced holes 33 in the arm 20. The spring 25 reacts against a bolt 34 which extends through the flange 35 of an anchor block 36 and is adjustably fixed thereto by means of a pair of nuts 37 on opposite sides of the flange 35. The anchor block 36 is fixed to the web of the pulley 5 by means of bolts 38. The block 36 also serves to counterbalance the pulley to insure smooth vibrationless rotation.

The governor arm 20 is adapted to swing between two limits. The outer limit of swinging movement is determined by a stop 39 fixed to the pulley 5 by means of a bolt 40, while the limit of inward movement of the weighted arm 20 is determined by a stop flange 41 on the hub flange 13, against which the arm 20 is held by the spring 25 when the pulley is stationary.

A gear 45 is mounted on a hub 46 which is journaled on the driven shaft 6 adjacent the pulley hub 12. The gear hub 46 is provided with a plurality of axially extending clutch jaws 47, formed integrally therewith. The jaws 47 intermesh with a number of cooperative jaws 48 which are formed integrally with a sliding clutch member 49, which is slidable axially on the shaft 6 but is prevented from rotating with respect thereto by means of a key 50. The clutch member 49 is normally held in engagement by means of a coil spring 51 which reacts against the bearing 8 and tends to force the jaws 48 into mesh with the jaws 47 on the gear hub 46, but the clutch member 49 can be manually shifted out of mesh by means of a suitable shifting fork 52 which is slidable within a groove 53 in the clutch member 49. Therefore, the gear 45 is normally fixed to the shaft 6 to transmit power to the latter during operation.

The gear 45 receives power through a planet member 55 comprising a planet pinion 56 and a circular disk 57 fixed together and adapted to rotate as a unit on a bearing sleeve 58 which is supported on the hub flange 13 by means of a bolt 59.

Figure 4:
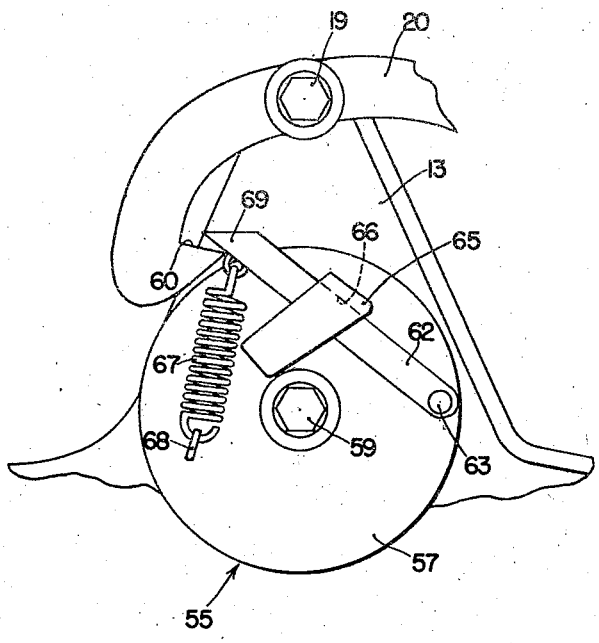
Figure 4 is an enlarged scale partial elevational view similar to Figure 3, showing the positions of the parts during normal driving conditions.

The arm 20 is provided adjacent the pivot bolt 19 and on the opposite side of the latter from the flyball 21, with a driving element in the form of a downwardly and inwardly extending hook portion 60 which is adapted to engage a connecting element in the form of a pawl 62 pivotally connected by means of a pin 63 to the disk 57 of the planet member 55. The pin 63 is disposed near the edge of the disk 57 in spaced relation to the axis of rotation of the latter, while the pawl 62 extends across the disk 57 at one side of the axis of rotation and is disposed within a guide or retainer 65 which slidably engages the pawl 62 to hold the latter against the disk 57. A slot 66 in the guide 65 provides a pair of limit stops to limit the amount of swinging movement of the pawl 62 about the pivot pin 63. The pawl 62 is held in retracted position by means of a tension spring 67 connected between the pawl 62 and an eyebolt 68 fixed to the disk 57. In this position, the pawl extends across the face of the disk 57 adjacent the axis of rotation of the latter and is held against the end of the slot 66 by the spring 67, the outer end 69 of the pawl 62 barely projecting over the edge of the disk 57. The spring 67 is yieldable to permit the pawl 62 to swing about the axis of the pin 63 to the outer end of the slot 66 in the guide 65, in which position the end 69 of the pawl projects a greater distance beyond the edge of the disk 57, as shown in Figure 4.

Figure 3:
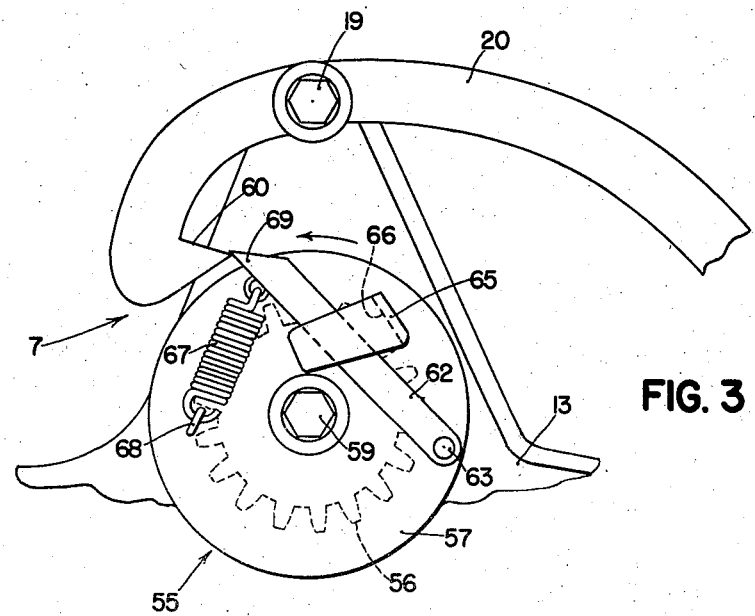
Figure 3 is a fragmentary elevational view drawn to an enlarged scale and showing the position of the interengageable elements of the mechanism at the instant the contact is made in starting the driven member.

When the driving pulley 5 is standing still, the flyball arm 20 is held in retracted position by the spring 25, against the inner stop 41. In this position of the arm 20 the hook portion 60 is then in its retracted position outwardly from the end of the pawl 62. This position is illustrated in Figure 1. As the pulley 5 is brought up to speed by the drive belt 11, the centrifugal force acting against the flyball 21 begins to move the latter outwardly away from the axis of rotation, thereby swinging the hook portion 60 inwardly toward the outer end 69 of the pawl 62, the latter being retained by the spring 67 in its retracted position as shown in Figure 1. Since the planet member 55 is now free to rotate about its supporting bolt 59, no power is transmitted to the shaft 6, but the pulley 5 rotates on the shaft 6 and the planet pinion 56 rolls around the stationary gear 45, which is fixed to the shaft. Inasmuch as the pinion 56 is considerably smaller in diameter than the gear 45, in the order of one-half the diameter of the latter or less, the planet member 55 makes several rotations about the axis of the bolt 59 during a revolution of the pulley 5. As the speed of the pulley 5 increases, the flyball 21 moves outwardly, thereby swinging the hook portion 60 inwardly until the latter engages the outer end 69 of the pawl 62. Upon interengagement of the two elements 60, 69, further rotation of the parts in the directions indicated by the arrows in Figures 1 and 3, causes the pawl 62 to be swung outwardly within the slot 66 until the outer end of the slot is engaged by the pawl, in the position indicated in Figure 4. In this position of the parts, it will be noted that there is a secure engagement between the hook portion 60 and the end 69 of the pawl 62, by virtue of the appreciable overlap between the elements. This secure engagement between the interengageable parts is obtained without any substantial movement of the arm 20 about the pivot bolt 19.

With the elements 60, 69 in secure engagement, and with the pawl 62 bearing against the outer end of the slot 66, the planet member 55 is thus held stationary with respect to the pulley 5 and consequently there can no longer be any relative movement between the pinion 56 and the gear 45. Hence, the gear 45 is locked to the pulley 5 and begins to rotate therewith. Inasmuch as the gear 45 is connected to the shaft 6 through the jaw clutch 47, 48 and the key 50, the shaft 6 also rotates with the pulley 5. Thus, during normal operation power is transmitted from the drive belt 11 to the shaft 6 directly without relative movement between the gears 56, 45 and other parts of the mechanism.

In the event that an excessive overload is imposed upon the machine, the speed begins to fall off, whereupon the centrifugal force against the flyball 21 is decreased, thereby permitting the spring 25 to retract the arm 20 and swing the hook portion 60 outwardly to the end 69 of the pawl 62. As soon as the interengageable elements 60, 69 separate, the spring 67 retracts the pawl 62 inwardly until the latter engages the inner end of the slot 66, thereby appreciably separating the two elements 60, 69. This releases the planet member 55, permitting it to rotate relative to the gear 45, whereupon the connection between the pulley 5 and the shaft 6 is broken, allowing the shaft 6 to stop until the pulley 5 has increased its speed sufficiently to bring the elements 60, 69 into engagement once more. It will be noted that there is a substantial radial distance between the peripheral path of the outer end 69 of the pawl 62 in extended position and the peripheral path of the end 69 in retracted position and therefore there must be a substantial increase in speed of the drive pulley 5 after the engageable elements have been disengaged before they are brought into engagement once more. It will also be noted that by virtue of the relative outward movement of the pawl 62 into secure engagement with the hook 60, there is no opportunity for the interengageable elements to break apart after engagement, as they might do in case the pawl 62 were rigidly fixed to the disk 57. In such case, the shaft 6 would be started with the interengageable elements barely overlapping so that there would be a strong tendency for the elements to break apart several times before they became securely interengaged.

The mechanical advantage between the planet member 55 and the shaft 6 reduces the operating pressure between the interengageable elements 60, 69, thus minimizing the friction between the elements, thereby reducing wear and also making the governor more sensitive to changes in speed.

Figure 2:
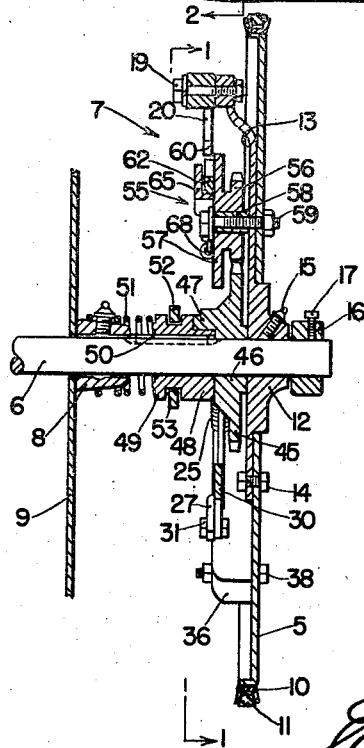
Figure 2 is a sectional elevation taken along a line 2—2 in Figure 1.

The shaft 6 can be manually disconnected from the drive pulley 5 by shifting the fork 52 toward the left as viewed in Figure 2, against the action of the spring 51, to separate the jaws 47, 48. This permits the gear 45 to rotate idly on the shaft 6 so that power transmission is interrupted.

Attention is called to the fact that the spring 67 provides a certain amount of cushioning action when the elements 60, 69 interengage, for the immediate effect of the interengagement is to cause the pawl 62 to swing outwardly against the tension of the spring 67.

I claim:

1. In a power transmitting connection, the combination of a rotary driving member, a rotary driven member, an arm pivotally connected to one of said members and having a weighted portion adapted to move outwardly under the action of centrifugal force, a spring opposing said outward movement, a planet member rotatably mounted on said one member, drive means connecting said planet member to the other of said members for rotating said planet member by relative movement between said driving and driven members, and a pair of interengageable elements on said arm and on said planet member, respectively, adapted to be engaged or disengaged by movement of said arm about its pivot connection responsive to a change in speed of said members, at least one of said elements being movable relative to its support and having a lost motion connection thereto so arranged and constructed that upon engagement of the edges of said elements by movement of said arm the initial transmission of driving force acts to move said one element through the range of its lost motion connection into more secure engagement with the other of said elements.

2. In a power transmitting connection, the combination of a rotary driving member, a rotary driven member, an arm pivotally connected to said driving member and having a weighted portion adapted to move outwardly under the action of centrifugal force, a spring opposing said outward movement, a planet member rotatably mounted on said driving member, drive means connecting said planet member to said driven member for rotating said planet member by relative rotation between said driving and driven members, and a pair of interengageable elements on said arm and on said planet member, respectively, said elements being held in engagement by said weighted portion tending to move outwardly, and disengaged by action of said spring when the speed of said members decreases below a certain amount, one of said elements being movably mounted on said planet member and having a lost motion connection thereto so arranged and constructed that upon engagement of the edges of said elements by movement of said arm the initial transmission of driving force acts to move said one element through the range of its lost motion connection into more secure engagement with the other of said elements.

3. In a power transmitting connection, the combination of a rotary driving member, a rotary driven member, an arm pivotally connected to said driving member and having a weighted portion adapted to move outwardly under the action of centrifugal force, a spring opposing said outward movement, a planet member rotatably mounted on said driving member, drive means connecting said planet member to said driven member for rotating said planet member by relative rotation between said driving and driven members, and a pair of interengageable elements on said arm and on said planet member, respectively, said elements being held in engagement by said weighted portion tending to move outwardly, and disengaged by action of said spring when the speed of said members decreases below a certain amount, one of said elements being movably mounted on said planet member by means providing for limited amount of motion toward and away from a position of engagement with said element on said arm, and spring means for urging said one element toward retracted position, whereby upon disengagement of said elements by movement of said arm said one element is retracted to prevent immediate reengagement.

4. In a power transmitting connection, the combination of a rotary driving member, a rotary driven member, an arm pivotally connected to said driving member and having a weighted portion adapted to move outwardly under the action of centrifugal force, a spring opposing said outward movement, a planet member rotatably mounted on said driving member, drive means connecting said planet member to said driven member for rotating said planet member by relative rotation between said driving and driven members, and a pair of interengageable elements on said arm and on said planet member, respectively, said elements being held in engagement by said weighted portion tending to move outwardly, and disengaged by action of said spring when the speed of said members decreases below a certain amount, one of said elements being pivotally mounted on said planet member in offset relation to the axis of rotation of the latter and swingable toward and away from said axis but biased for movement toward the latter, and stop means for limiting the extent of outward movement, whereby upon engagement of said elements by movement of said arm outwardly to a position corresponding to a certain speed of rotation, said one element is moved outwardly by the driving force acting through said elements, into abutment with said stop means, thereby effecting immediately a secure driving connection between the elements.

5. In a power transmitting connection, the combination of a pair of coaxially disposed rotary driving and driven members, an arm pivotally connected to said driving member and having a weighted portion adapted to move outwardly under the action of centrifugal force, a spring opposing said outward movement, a planet member rotatably mounted on said driving member on an axis spaced from the pivot axis of said arm, a pair of intermeshing gears, one of said gears being fixed to said driven member coaxially therewith and the other gear being fixed to said planet member coaxially therewith, and a pair of interengageable elements associated with said arm and said planet member, respectively, said elements being out of engagement when said arm is in retracted position, thereby permitting free rotation of said driving member with no power transmitted to said driven member, said elements being engaged responsive to outward movement of said arm under the action of centrifugal force when said driving member reaches a predetermined speed, for connecting said driving and driven members together to rotate as a unit.

6. In a power transmitting connection, the combination of a pair of coaxially disposed rotary driving and driven members, an arm pivotally connected to said driving member and having a weighted portion adapted to move outwardly under the action of centrifugal force, a spring opposing said outward movement, a planet member rotatably mounted on said driving member on an axis spaced from the pivot axis of said arm, a pair of intermeshing gears, one of said gears being fixed to said driven member coaxially therewith and the other gear being fixed to said planet member coaxially therewith, and a pair of interengageable elements mounted on said arm and said planet member, respectively, said elements being out of engagement when said arm is in retracted position, thereby permitting free rotation of said driving member with no power transmitted to said driven member, said elements being engaged responsive to outward movement of said arm under the action of centrifugal force when said driving member reaches a predetermined speed, for connecting said driving and driven members together to rotate as a unit, said element on said planet member being mounted for a limited amount of movement toward and away from a position of engagement with the other of said elements and so arranged and constructed that upon engagement of the edges of said elements the initial transmission of driving force acts to move said planet-mounted element into more secure engagement with said other element, and spring means biasing said planet-mounted element toward retracted position.

7. In a power transmitting connection, the combination of a rotary driving member, a rotary driven member, an arm pivotally connected to said driving member, a weight on said arm for swinging said arm outwardly under the action of centrifugal force, means mounting the weight on the arm for adjustment of the weight along the arm toward and away from the pivot, means for securing said weight in adjusted position, a spring opposing said outward movement, a planet member rotatably mounted on said driving member, drive means connecting said planet member to said driven member for rotating said planet member by relative rotation between said driving and driven members, and a pair of interengageable elements on said arm and on said planet member, respectively, serving as the sole connection between said members, said elements being held in engagement by said weighted portion tending to move outwardly, and disengaged by action of said spring when the speed of said members decreases below a certain amount, thereby interrupting the transmission of power between said members.

HENRY E. KORUM.

REFERENCES CITED

The following references are of record in the file of this patent:

UNITED STATES PATENTS

| Number | Name | Date |
|---|---|---|
| 642,936 | Thompson | Feb. 6, 1900 |
| 1,712,512 | Morici | May 14, 1929 |
| 1,728,325 | Blackstock | Sept. 17, 1929 |